United States Patent
Edvardsson

(10) Patent No.: US 9,228,877 B2
(45) Date of Patent: Jan. 5, 2016

(54) GUIDED WAVE RADAR LEVEL GAUGE SYSTEM WITH DIELECTRIC CONSTANT COMPENSATION THROUGH MULTI-FREQUENCY PROPAGATION

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 294 days.

(21) Appl. No.: 13/627,322

(22) Filed: Sep. 26, 2012

(65) Prior Publication Data

US 2014/0085130 A1 Mar. 27, 2014

(51) Int. Cl.
*G01S 13/08* (2006.01)
*G01F 23/284* (2006.01)
*G01S 13/88* (2006.01)

(52) U.S. Cl.
CPC ............. *G01F 23/284* (2013.01); *G01S 13/88* (2013.01)

(58) Field of Classification Search
CPC .............................. G01F 23/284; G01S 13/88
USPC ........................................................ 342/124
See application file for complete search history.

(56) References Cited

U.S. PATENT DOCUMENTS

| | | | |
|---|---|---|---|
| 6,690,320 B2 * | 2/2004 | Benway et al. | 342/124 |
| 6,915,689 B2 * | 7/2005 | Edvardsson | 73/290 V |
| 7,053,630 B2 * | 5/2006 | Westerling et al. | 324/644 |
| 7,525,476 B1 | 4/2009 | Delin et al. | |
| 7,589,664 B2 * | 9/2009 | Jirskog | 342/124 |
| 7,965,087 B2 * | 6/2011 | Reimelt et al. | 324/533 |
| 8,567,243 B2 * | 10/2013 | Malinovskiy et al. | 73/304 C |
| 2001/0050629 A1 * | 12/2001 | Benway et al. | 342/124 |
| 2004/0080324 A1 | 4/2004 | Westerling et al. | |
| 2007/0090992 A1 * | 4/2007 | Edvardsson | 342/124 |
| 2009/0158839 A1 * | 6/2009 | Spanke et al. | 73/290 V |
| 2009/0256737 A1 | 10/2009 | Ohlsson | |
| 2013/0298667 A1 * | 11/2013 | Bechtel et al. | 73/304 |

FOREIGN PATENT DOCUMENTS

| | | |
|---|---|---|
| EP | 2 166 321 A2 | 3/2010 |
| WO | WO 2012100873 A1 * | 8/2012 |
| WO | WO 2012159682 A1 | 11/2012 |

OTHER PUBLICATIONS

Notification of Transmittal of the International Search Report and the Written Opinion of the International Searching Authority, or the Declaration dated Feb. 25, 2014 in related International Application No. PCT/SE2013/000138, filed Sep. 5, 2013. 10 pgs.

* cited by examiner

*Primary Examiner* — John B Sotomayor
*Assistant Examiner* — Marcus Windrich
(74) *Attorney, Agent, or Firm* — Westman, Champlin & Koehler, P.A.

(57) ABSTRACT

The present invention relates to a method of determining a filling level of a product contained in a tank by propagating a first transmitted electromagnetic signal in a first frequency range and a second transmitted electromagnetic signal in a second frequency range different from the first frequency range along a transmission line probe towards a surface of the product in the tank, receiving a first reflected electromagnetic signal in the first frequency range and a second reflected electromagnetic signal in the second frequency range, and determining the filling level based on a time-of-flight of the first reflected electromagnetic signal and a difference in time-of-flight of the first reflected electromagnetic signal and the second reflected electromagnetic signal.

13 Claims, 4 Drawing Sheets

GUIDED WAVE RADAR LEVEL GAUGE SYSTEM WITH DIELECTRIC CONSTANT COMPENSATION THROUGH MULTI-FREQUENCY PROPAGATION

TECHNICAL FIELD OF THE INVENTION

The present invention relates to a guided wave radar level gauge system and to a method of determining a filling level in a tank.

TECHNICAL BACKGROUND

Radar level gauge systems are in wide use for measuring process variables of products contained in tanks, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe. The transmission line probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

This propagation velocity is influenced by various factors, such as the configuration of the transmission line probe and environmental conditions inside the tank. Such environmental conditions, for example, include the composition of the atmosphere above the surface of the product contained in the tank, and product residue which may have adhered to the probe as the filling level of the product changes inside the tank.

In boiler applications, for example, the atmosphere inside the boiler tank may be steam under high pressure, in which case the difference in dielectric constant may be quite large for different operating conditions.

U.S. Pat. No. 7,525,476 discloses a guided wave radar level gauge system in which reference reflectors are provided at known positions along the transmission line probe and in which the difference between the measured distance and the known distance between a pair of reference reflectors is used to compensate for variations in propagation velocity caused by variations in the propagation conditions along the transmission line probe.

Although allowing for a more accurate filling level determination in applications with varying propagation properties inside the tank, the reference reflectors reflect a portion of the signal, which means that there is some reduction in the sensitivity of the radar level gauge system as compared to a corresponding guided wave radar level gauge system without reference reflectors.

SUMMARY

In view of the above, it would be desirable to provide a guided wave radar level gauge system in which accurate filling level determination can be achieved in applications with varying propagation properties without the need for providing reference reflectors along the transmission line probe.

According to a first aspect of the present invention, it is therefore provided a guided wave radar level gauge system, for determination of a filling level of a product contained in a tank, the guided wave radar level gauge system comprising: a transceiver for generating, transmitting and receiving electromagnetic signals in a first frequency range and in a second frequency range different from the first frequency range; a transmission line probe connected to the transceiver, and arranged and configured to guide transmitted electromagnetic signals from the transceiver through a surrounding medium towards the product inside the tank, and to return reflected electromagnetic signals resulting from reflection of the transmitted electromagnetic signals by a surface of the product back towards the transceiver, the transmission line probe being configured to guide electromagnetic signals in the first frequency range with a first propagation velocity exhibiting a first dependence on a dielectric constant of the surrounding medium, and guide electromagnetic signals in the second frequency range with a second propagation velocity exhibiting a second dependence, different from the first dependence, on the dielectric constant of the surrounding medium; and processing circuitry connected to the transceiver for determining the filling level based on a first reflected electromagnetic signal in the first frequency range, a second reflected electromagnetic signal in the second frequency range, and a known relation between the first dependence and the second dependence on the dielectric constant of the surrounding medium.

The "transceiver" may be one functional unit capable of transmitting and receiving electromagnetic signals, or may be a system comprising separate transmitter and receiver units. Moreover, the transceiver may comprise a first transceiver unit operating in the first frequency range and a second transceiver unit operating in the second frequency range.

The processing circuitry may be configured to control the transceiver(s) to provide a first electromagnetic transmission signal in the first frequency range and a second electromagnetic transmission signal in the second frequency range simultaneously or in sequence one after the other. For example, the first electromagnetic transmission signal may first be transmitted and a reflection thereof at the surface be received, and thereafter the second electromagnetic transmission signal may be transmitted and a reflection thereof at the surface be received. Transmitting the first and second electromagnetic transmission signals in sequence may be advantageous to keep down the current consumption of the guided wave radar level gauge system.

The known relation between the first dependence and the second dependence may, for example, be the ratio between the first dependence and the second dependence, or, in other words, the dependence of the ratio between the first propagation velocity and the second propagation velocity on the dielectric constant of the surrounding medium.

The tank may be any container or vessel capable of containing a product, and may be metallic, or partly or completely non-metallic, open, semi-open, or closed.

The present invention is based on the realization that a transmission line probe can be configured in such a way that the interaction or coupling between an electromagnetic signal and a surrounding medium is dependent on the frequency of the electromagnetic signal.

The present inventor has further realized that the stronger the interaction or coupling between an electromagnetic signal and the surrounding medium is, the more influence will the dielectric properties of the surrounding medium have on the propagation velocity of the electromagnetic signal along the transmission line probe. This insight can be utilized to achieve a correct filling level determination even when the dielectric properties of the surrounding medium, such as the tank atmosphere, are unknown.

In other words, given a suitably configured transmission line probe, two electromagnetic signals in different frequency ranges traveling along the transmission line probe are influenced differently by changes in the dielectric constant of the medium surrounding the transmission line probe. Hereby, a filling level determination that is independent of the dielectric constant of the medium surrounding the transmission line probe can be achieved.

As a consequence, the effect of probe contamination on the propagation velocity of the electromagnetic signals, in addition to the effect of the presence of vapor above the surface, can be compensated for even in cases when the probe contamination and/or the presence of vapor above the surface would result in a non-uniform change of the propagation velocity.

Accordingly, the guided wave radar level gauge system according to various embodiments of the present invention provides for accurate filling level measurement even in cases when the atmosphere in the tank has an unknown and possibly non-uniform dielectric constant, and the transmission line probe has an unknown amount of tank content adhering to it.

The dependence of the propagation velocity for each frequency range on the dielectric constant of the surrounding medium may, for example, be empirically determined. Depending on the actual configuration of the transmission line probe, it may also be feasible to determine an equation specifying the propagation velocity as a function of the dielectric constant of the surrounding medium.

To facilitate the determination of the filling level by providing for distinctly different dependencies on the dielectric properties of the surrounding medium for the first and second frequency ranges, the first frequency range may have a first center frequency and the second frequency range may have a second center frequency, the second center frequency being at least two times the first center frequency. In other words, the second frequency range may be at at least twice the frequency of the first frequency range. To provide for even more distinctly different dependencies and/or allow for greater flexibility in the design of the transmission line probe, the difference between the first and the second frequency range may be greater. For example, the second center frequency may be higher than one of three times, five times and ten times the first center frequency.

For each frequency range, the bandwidth may be around 1 GHz.

Advantageously, the second center frequency may be at least 3 GHz, such as at least 4 GHz, 5 GHz or 6 GHz. Suitable center frequencies of the first frequency range and the second frequency range may, for example, be 0.5 GHz and 6 GHz. For such frequency ranges, a sufficiently large difference in propagation velocity dependence can be achieved, and standard components can be used in the guided wave radar level gauge system. This allows for a cost-efficient GWR system.

According to various embodiments, the transmission line probe may comprise a probe conductor and a dielectric enclosing structure at least partly enclosing the probe conductor.

The dielectric enclosing structure may advantageously fully enclose substantially all of a portion of the probe conductor being arranged inside the tank.

This type of the transmission line probe will in the following be referred to as a Partially External Dielectric (PED) transmission line probe.

The propagation velocity along the PED transmission line probe is characterized by an effective dielectric constant $\in_{\mathit{eff}}$ which depends on the dielectric constant of the dielectric enclosing structure $\in_{\mathit{int}}$ and the dielectric constant of the surrounding medium (air, steam, product vapor, probe contamination etc) $\in_{\mathit{ext}}$. The propagation velocity of the electromagnetic signal travelling along the transmission line probe is given by the velocity of light divided by the square root of $\in_{\mathit{eff}}$.

The effective dielectric constant $\in_{\mathit{eff}}$ of the PED transmission line probe depends on the dielectric constant of the dielectric enclosing structure $\in_{\mathit{int}}$ and the dielectric constant of the surrounding medium $\in_{\mathit{ext}}$ according to the following relation:

$$\varepsilon_{\mathit{eff}} \sim \frac{1}{\dfrac{\alpha}{\varepsilon_{\mathit{ext}}} + \dfrac{1-\alpha}{\varepsilon_{\mathit{int}}}}$$

where $\alpha$ is a number between 0 and 1 which indicates the degree of coupling to the surrounding medium. With $\alpha=1$, we have naked wires (and maximum influence of the surrounding medium) and with $\alpha=0$ we have a line fully screened from the surrounding medium (such as a closed coaxial line).

Since $\in_{\mathit{eff}}$ determines the propagation velocity along the transmission line probe, the transmission line probe may advantageously be configured such that electromagnetic signals in different frequency ranges experience different values of $\alpha$. For example, the transmission line probe may be configured such that $\alpha$ and $\in_{\mathit{int}}$ are uniform along the transmission line probe, but the determination of the dielectric constant $\in_{\mathit{ext}}$ of the surrounding medium will be possible as long as any variations of $\alpha$ and $\in_{\mathit{int}}$ are known.

The thickness of the dielectric enclosing structure, in a radial direction in respect of the probe conductor, may be greater than one of 3 millimeters, 4 millimeters and 5 millimeters. This is the case for many suitable dielectric materials, such as PTFE. For a dielectric material having a higher dielectric constant, the dielectric enclosing structure could be made thinner.

According to various embodiments, the transmission line probe may have one probe conductor only. A single conductor transmission line probe may be beneficial for many applications. A single conductor transmission line probe is very simple and robust and can be used even for demanding applications, such as for measurements in hot steam under high pressure. Furthermore, since no spacing structures etcs are needed as is typically the case for multiple conductor transmission line probes, a GWR system using a single conductor transmission line probe may be a particularly cost-efficient alternative. Moreover, a single conductor transmission line probe is relatively simple to feed with electromagnetic signals from the transceiver.

The single conductor may be rigid or flexible. In particular for a flexible single conductor transmission line probe, the probe conductor may comprise at least two twisted conducting wires being in electrically conductive contact with each other. Such conducting wires need, however, not be twisted, but the probe conductor may be provided as a stranded wire enclosed by a polymeric jacket. In other words, the transmission line probe may comprise a probe core formed by a stranded wire and a polymeric jacket covering the probe core. In the case of a rigid transmission line probe, the transmission line probe may comprise a probe core formed by a metal pin and a polymeric jacket covering the probe core.

As an alternative (or in combination) the transmission line probe may comprise a perforated metal ribbon. The dielectric layer enclosing a PED-type transmission line probe effectively works as an inductive layer and may be substituted by a metallic structure with similar function. For example, a perforated metal ribbon will exhibit similar signal propagation properties as a PED-type transmission line probe. To provide for a mechanically robust transmission line probe, the metal ribbon may have a curved cross-section, similar to a longitudinal segment of a pipe, for instance a half-pipe. The perforation may be in the form of elongated holes with such dimensions that the resonance frequency of the holes is close to the second frequency range. In this case, the surrounding medium (liquid or gas) will detune the holes and change the propagation properties of the metal ribbon.

By using a transmission line probe configured to propagate electromagnetic signals in different frequency ranges with different (and known) values of $\alpha$, the unknown dielectric constant $\in_{ext}$ of the surrounding medium can be determined, which means that the filling level can be determined accurately without prior knowledge of the dielectric constant of the surrounding medium in the tank.

According to various embodiments, furthermore, the transceiver of the guided wave radar level gauge system may advantageously comprise a first sub-transceiver for generating, transmitting and receiving electromagnetic signals in the first frequency range; and a second sub-transceiver for generating, transmitting and receiving electromagnetic signals in the second frequency range, wherein the first sub-transceiver and the second sub-transceiver are both connected to the transmission line probe.

According to a second aspect of the present invention, it is provided a method of determining a filling level of a product contained in a tank, comprising the steps of: propagating a first transmitted electromagnetic signal in a first frequency range and a second transmitted electromagnetic signal in a second frequency range different from the first frequency range along a transmission line probe towards a surface of the product in the tank; receiving a first reflected electromagnetic signal in the first frequency range resulting from reflection of the first transmitted electromagnetic signal at the surface and a second reflected electromagnetic signal in the second frequency range resulting from reflection of the second transmitted electromagnetic signal at the surface; and determining the filling level based on a time-of-flight of the first reflected electromagnetic signal and a difference in time-of-flight of the first reflected electromagnetic signal and the second reflected electromagnetic signal.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing example embodiments of the invention, wherein:

FIG. 1b is a schematic illustration of the measurement electronics unit comprised in the guided wave radar level gauge system in FIG. 1a;

DETAILED DESCRIPTION OF AN EXAMPLE EMBODIMENT OF THE INVENTION

Figure 1A:
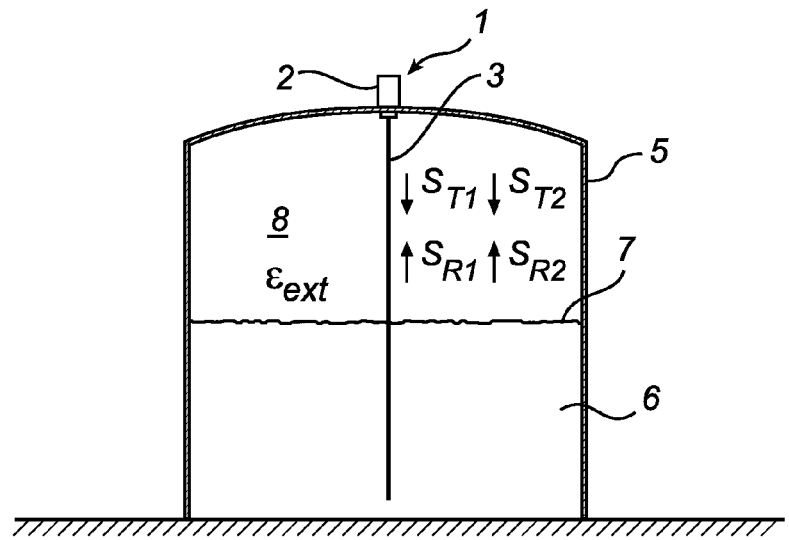
FIG. 1a schematically illustrates a guided wave radar level gauge system according to an embodiment of the present invention installed in an exemplary tank.

FIG. 1a schematically illustrates a radar level gauge system 1 according to an embodiment of the present invention, comprising a measurement electronics unit 2, and a transmission line probe 3. The radar level gauge system 1 is provided on a tank 5, which is partly filled with a product 6 to be gauged. By guiding a first transmitted electromagnetic signal $S_{T1}$ in a first frequency range $F_1$ and a second transmitted electromagnetic signal $S_{T2}$ in a second frequency range $F_2$ different from the first frequency range $F_1$ towards the surface 7 of the product 6, and analyzing a first reflected signal $S_{R1}$ in the first frequency range $F_1$ and a second reflected signal $S_{R2}$ in the second frequency range $F_2$ traveling back from the surface 7 along the transmission line probe 3, the measurement electronics unit 2 can determine the distance between a reference position (such as the tank ceiling) and the surface 7 of the product 6, whereby the filling level can be deduced even if the dielectric constant $\in_{ext}$ of the medium 8 in the tank surrounding the transmission line probe 3 is unknown and/or varying. It should be noted that, although a tank 5 containing a single product 6 is discussed herein, the distance to any material interface along the transmission line probe 3 can be measured in a similar manner as long electromagnetic signals are reflected at the material interface and return to the measurement electronics unit 2.

Figure 1B:
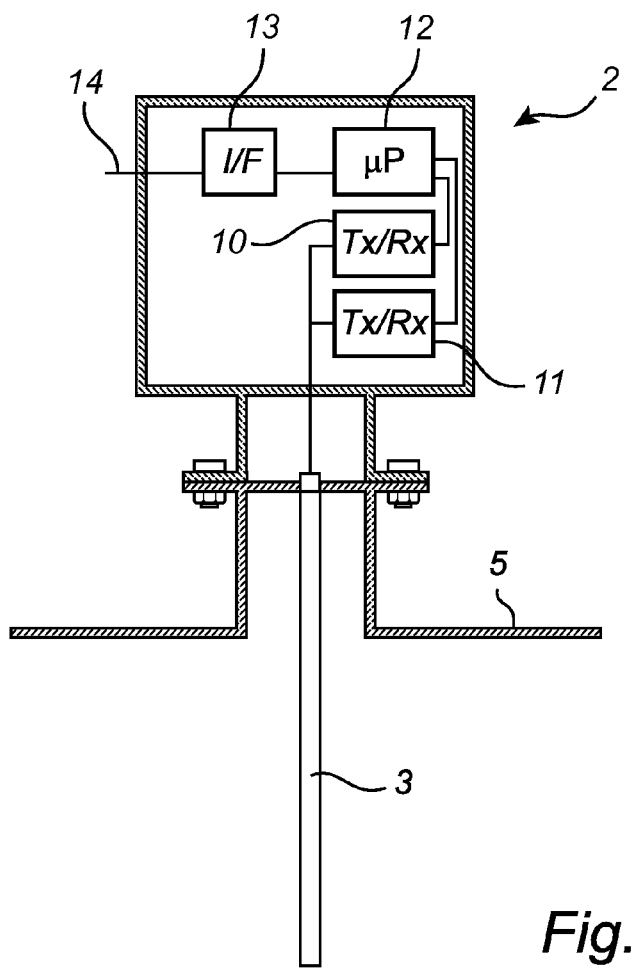

As is schematically illustrated in FIG. 1b, the measurement electronics unit 2 comprises a first transceiver unit 10, a second transceiver unit 11, a processing unit 12, and a communication interface 13. The first transceiver unit 10 is configured to generate, transmit and receive electromagnetic signals in the above-mentioned first frequency range $F_1$, and the second transceiver unit 11 is configured to generate, transmit and receive electromagnetic signals in the above-mentioned second frequency range $F_2$. The processing unit 12 is connected to the first transceiver unit 10 and the second transceiver unit 11 for control of the transceiver units and processing of signals received by the transceivers to determine the filling level of the product 6 in the tank 5. The processing unit 12 is, furthermore, connectable to external communication lines 14 for analog and/or digital communication via the interface 13. Moreover, although not shown in FIG. 1b, the guided wave radar level gauge system 1 may be connectable to an external power source, may comprise a local energy store, such as a battery, or may be powered through the external communication lines 14. The radar level gauge system 1 may be configured to communicate wirelessly.

The first 10 and second 11 transceiver units may both be directly connected to the transmission line probe 3 along a common line as is schematically indicated in FIG. 1*b*, which will result in some loss of signal strength. Alternatively, the measurement electronics unit may comprise a diplexer or a switch to rout the electromagnetic signals from the first 10 and second 11 transceiver units to the probe. This latter solution, which is well-known to those skilled in the art will result in only negligible signal loss.

The GWR-system 1 in FIGS. 1*a-b* may advantageously be a so-called pulsed system, in which an electromagnetic transmit signal in the form of a transmitted pulse train with a pulse repetition frequency are guide towards the surface 7 of the product 6 in the tank 5 along the transmission line probe 3. Reflection of the electromagnetic transmit signal at the surface 7 results in a reflected pulse train with the same pulse repetition frequency as the transmitted pulse train, but with a delay corresponding to the time of flight from the transceiver to the surface and back. By determining the delay, which is usually done by well-known time expansion techniques, the filling level can be deduced.

Figure 2A:
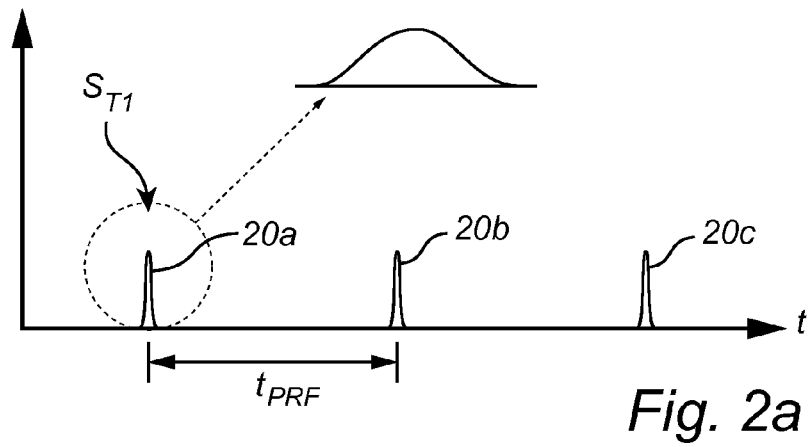
FIGS. 2a-b schematically illustrate examples of pulsed signals in different frequency ranges.
Figure 2B:
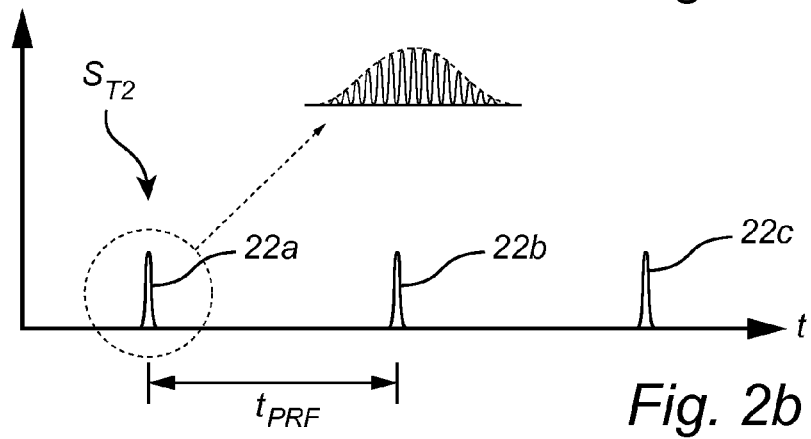

As is schematically illustrated in FIGS. 2*a-b*, at least one of the above mentioned first $S_{T1}$ and second $S_{T2}$ electromagnetic transmit signals may advantageously be provided as a pulse train formed by a modulated carrier signal.

Referring first to FIG. 2*a*, the first electromagnetic transmit signal $S_{T1}$ may be provided as a first train of pulses 20*a-c* with a pulse repetition frequency given by a time $t_{PRF}$ between successive pulses. As is schematically indicated in FIG. 2*a*, each pulse 20*a-c* is provided as a so-called DC-signal that is frequently used in so-called TDR-systems. The first center frequency $f_{c1}$ is then about 0.5 GHz, and the first frequency range $F_1$ is about 0.1 GHz-1 GHz.

Referring to FIG. 2*b*, the second electromagnetic transmit signal $S_{T2}$ may be provided as a second train of pulses 22*a-c* with a pulse repetition frequency given by a time $t_{PRF}$ between successive pulses. The pulse repetition frequency of the second electromagnetic transmit signal $S_{T2}$ may be the same as the pulse repetition frequency of the first electromagnetic transmit signal $S_{T1}$ or different. As is schematically indicated in FIG. 2*b*, each pulse 22*a-c* is provided as a modulated carrier signal having a second center frequency $f_{c2}$. The second center frequency $f_{c2}$ may, for example, be 6 GHz, and the second frequency range $F_2$ may then be, for instance, 5.5 GHz-6.5 GHz.

Although the first electromagnetic signal $S_{T1}$ is shown as a pulse train of so-called DC-pulses in FIG. 2*a*, it should be understood that the first electromagnetic signal $S_{T1}$ may equally well be a pulse train formed by a modulated carrier signal. In this case, the first center frequency $f_{c1}$ may, for example, be about 1 GHz, and the first frequency range $F_1$ may then be 0.5-1.5 GHz.

Referring again briefly to FIG. 1, the transmission line probe 3 is configured to guide electromagnetic signals in the first frequency range $F_1$ with a first propagation velocity $v_{prop1}$ exhibiting a first dependence on the dielectric constant $\in_{ext}$ of the surrounding medium 8 and to guide electromagnetic signals in the second frequency range $F_2$ with a second propagation velocity $v_{prop2}$ exhibiting a second dependence on the dielectric constant $\in_{ext}$ of the surrounding medium 8.

To facilitate the analysis of received signals in the first $F_1$ and the second $F_2$ frequency ranges, it may be desirable if the transmission line probe 3 is configured to allow coupling between the guided electromagnetic signal and the surrounding atmosphere 8 that is distinctly different for the first $F_1$ and the second $F_2$ frequency ranges.

Two examples of single conductor transmission line probes capable of providing such distinctly different coupling will be described below with reference to FIG. 3 and FIG. 4.

Figure 3:
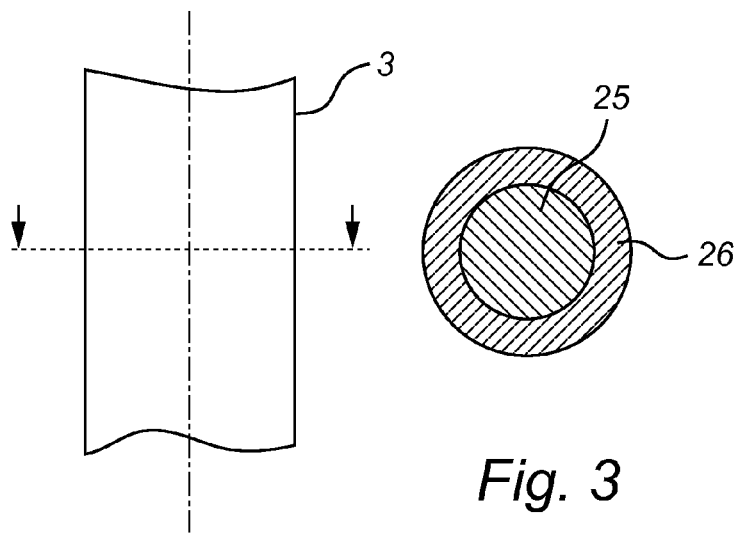
FIG. 3 schematically shows a first example of the transmission line probe in FIGS. 1a-b.

FIG. 3 schematically shows an example of the transmission line probe 3 in FIG. 1, comprising a single probe conductor, here in the form of a metal pin 25, and a dielectric enclosing structure provided in the form of a polymeric jacket 26.

The metal pin 25 may, for example, be made of stainless steel. However, many other metals are possible, such as copper, as the metal pin 25 is protected from the environment inside the tank 5 by the polymeric jacket 26. Moreover, the single probe conductor may equally well be flexible rather than rigid, in which case the single probe conductor may advantageously be provided in the form of a stranded wire.

The polymeric jacket 26 may have different properties depending on the intended field of application. Since it may be desirable to provide for distinctly different coupling between the electromagnetic signals and the surrounding medium (such as tank atmosphere 8), the polymeric jacket 26 may either be rather thick or have a rather high dielectric constant. The actual selection of material properties and dimensions of the polymeric jacket will be dependent on, for example, the properties of the material(s) in the tank 5. For instance, if the material(s) in the tank 5 are highly corrosive, it may be necessary to select a very durable material for the polymeric jacket 26, such as PTFE (polytetrafluoroethylene). However, since PTFE has a rather low dielectric constant (about 2.1), it may be necessary to make the polymeric jacket rather thick, such as at least 5 mm. A jacket made of a material having a higher dielectric constant can be made thinner. An example of a material with good chemical stability and a higher dielectric constant is PTFE mixed with a ceramic powder. PEEK (polyetheretherketone) is another durable polymer with a higher dielectric constant than PTFE.

Given the information and examples provided in the present application, it will be straight-forward for the skilled person to arrive at a suitable material combination of probe conductor 25 and polymeric jacket 26 for a particular application.

It should be noted that the transmission line probe 3 need not necessarily be provided in the form of an at least partially enclosed dielectric structure as long as the desired difference in propagation properties for the electromagnetic signals in different frequency ranges and the surrounding medium is achieved. For example, it may be possible to use a single conductor probe of a "poor conductor" without any dielectric cover. For instance, the single conductor probe may be made of stainless steel or have an other layer of stainless steel or other metal having a low electrical conductivity.

Furthermore, the dielectric layer, such as the polymeric jacket 26 in FIG. 3, effectively works as an inductive layer and may be substituted by a metallic structure with similar function. Accordingly, it is expected that, for example a single probe conductor provided in the form of a twisted pair of conductive wires may exhibit similar properties as the example of the transmission line probe 3 described above with reference to FIG. 3.

Another example of the transmission line probe 3 in FIG. 1 will now be described with reference to FIG. 4.

Figure 4:
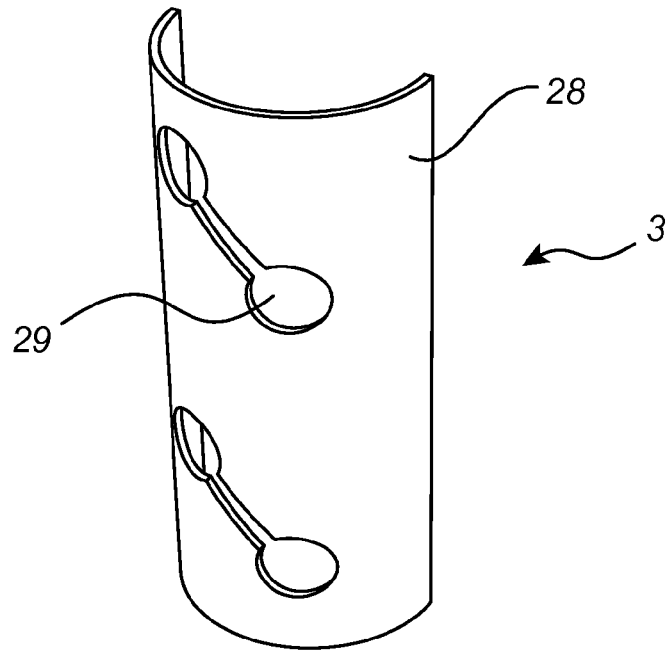
FIG. 4 schematically shows a second example of the transmission line probe in FIGS. 1a-b.

According to the example schematically shown in FIG. 4, the transmission line probe 3 is provided in the form of a metal ribbon 28 that is perforated by elongated holes 29. Because of the holes, the metal ribbon 28, here provided in the shape of a pipe segment, will exhibit similar properties as the partially enclosed dielectric structure described above with reference to FIG. 3. A suitable width of the ribbon may be about 20 mm and the length of the holes may roughly correspond to a half wavelength of the second frequency range (around 20-25 mm for a 6 GHz signal).

Through a suitable configuration of the transmission line probe 3, the first $S_{T1}$ and second $S_{T2}$ electromagnetic signals in different frequency ranges will have propagation velocities that depend on the dielectric constant of $\in_{ext}$ the surrounding medium 8 according to different known relations. Based on the time-of-flight in one of the frequency ranges, the difference in time-of-flight in the frequency ranges and the known different relations between the propagation velocities in the frequency ranges and the dielectric constant of the surrounding medium 8, an accurate filling level value can be determined without knowledge (or assumptions) about the dielectric constant $\in_{eff}$ of the surrounding medium 8.

For a transmission line probe 3 such as that described above with reference to FIG. 3, the effective dielectric constant $\in_{eff}$ of the transmission line probe 3 depends on the dielectric constant of the dielectric enclosing structure $\in_{int}$ and the dielectric constant $\in_{ext}$ of the surrounding medium 8 according to the following relation:

$$\varepsilon_{\mathit{eff}} \sim \frac{1}{\dfrac{\alpha}{\varepsilon_{ext}} + \dfrac{1-\alpha}{\varepsilon_{int}}}$$

where $\alpha$ is a number between 0 and 1 which indicates the degree of coupling to the surrounding medium. Moreover, the propagation velocity is inversely proportional to the square root of the effective dielectric constant $\in_{eff}$.

In accordance with the discussion above in connection with FIG. 4, it should be understood that a completely metallic transmission line probe may be used, and that the effective dielectric constant $\in_{ext}$ of such a transmission line probe will follow the same relation as a partially enclosed dielectric structure, with an "equivalent" dielectric constant $\in_{int}$.

Figure 5:
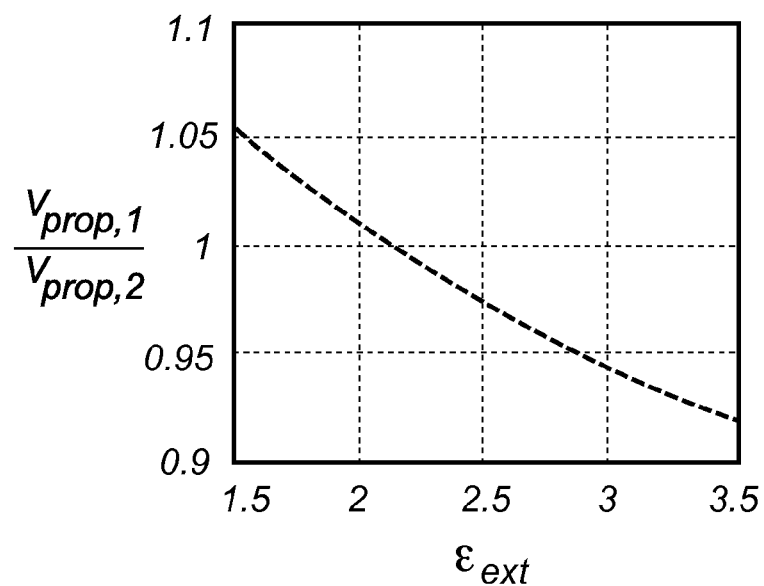
FIG. 5 is a diagram schematically illustrating the ratio between the propagation velocities for two different frequency ranges having different insulation factors $\alpha$ as a function of the dielectric constant of the surrounding medium.

To illustrate the resulting dependence of the propagation velocity on the dielectric constant $\in_{ext}$ of the surrounding medium 8, a diagram with the ratio between the propagation velocities for two different frequency ranges having different insulation factors $\alpha$ as a function of the dielectric constant $\in_{ext}$ of the surrounding medium 8 is provided in FIG. 5. For the exemplary case illustrated in FIG. 5, the insulation factor $\alpha_1$ for the first frequency range $F_1$ (1 GHz) is 0.73, and the insulation factor $\alpha_2$ for the second frequency range $F_2$ (6 GHz) is 0.41.

Figure 6:
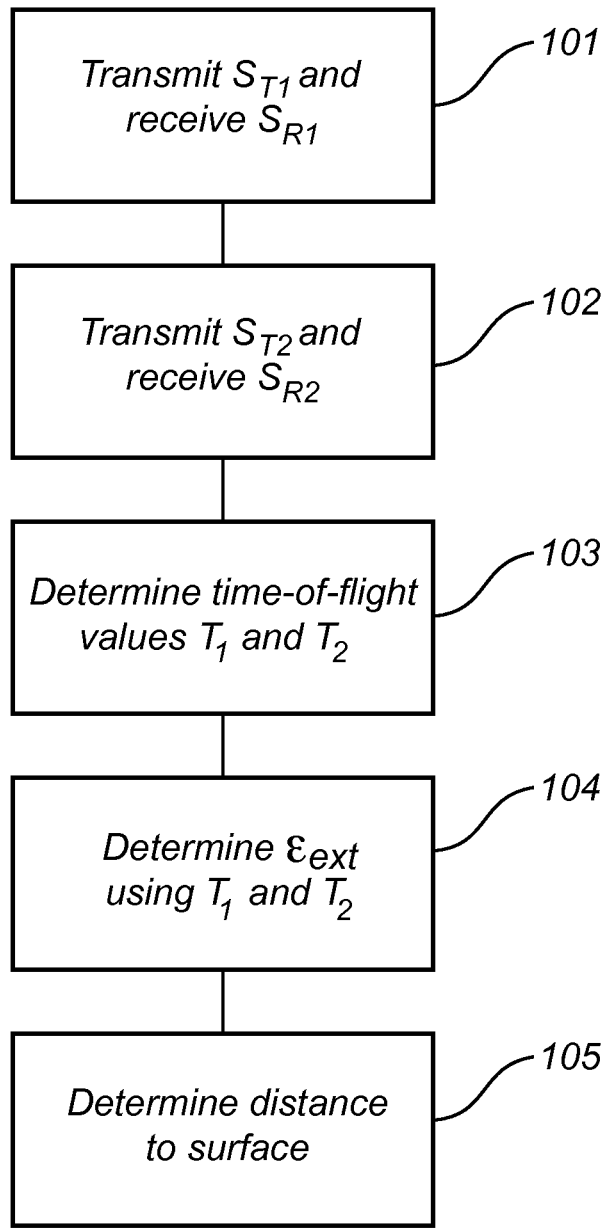
FIG. 6 is a flow-chart schematically illustrating an example embodiment of the method according to the present invention.

An example embodiment of the filling level determination method according to embodiments of the present invention will now be described with reference to the flow chart in FIG. 6 as well as to FIGS. 1*a-b*.

In a first step 101, a first electromagnetic transmit signal $S_{T1}$ in a first frequency range $F_1$ is transmitted along the transmission line probe 3 towards the surface 7 of the product 6 in the tank 5 and a first electromagnetic reflection signal $S_{R1}$ is received.

In a second step 102, a second electromagnetic transmit signal $S_{T2}$ in a second frequency range $F_2$ is transmitted along the transmission line probe 3 towards the surface 7 of the product 6 in the tank 5 and a second electromagnetic reflection signal $S_{R2}$ is received.

The transmission line probe is configured to fulfil the following two conditions:

The electromagnetic signals in the first frequency range $F_1$ and the second frequency range $F_2$ travel along the transmission line probe 3 with first $v_{prop1}$ and second $v_{prop2}$ propagation velocities that exhibit different dependencies on the dielectric constant $\in_{ext}$ of the surrounding medium 8 (different $\alpha$).

The electromagnetic signals in the first frequency range $F_1$ and the second frequency range $F_2$ exhibit sufficient coupling to the dielectric constant $\in_{ext}$ of the surrounding medium 8 to be reflected at the surface 7 of the product 6 (sufficiently large $\alpha$).

Two different examples of transmission line probes that fulfill the above conditions for suitably selected frequency ranges have been described above with reference to FIG. 3 and FIG. 4.

In a third step 103, the time-of-flight (or a value indicative of the time-of-flight) $T_1$ for the first frequency range $F_1$ and the time-of-flight $T_2$ for the second frequency range $F_2$ are determined.

Subsequently, in step 104, the dielectric constant $\in_{ext}$ of the surrounding medium 8 is determined using the time-of-flight values $T_1$, $T_2$ determined in step 103 and the known relation between the time-of-flight and the dielectric constant $\in_{ext}$ of the surrounding medium 8 for the two frequency ranges:

$$\varepsilon_{\mathit{eff}} \sim \frac{1}{\dfrac{\alpha}{\varepsilon_{ext}} + \dfrac{1-\alpha}{\varepsilon_{int}}}$$

Since the propagation velocity $v_{prop}$ is determined by the following relation:

$$v_{prop} = \frac{v_0}{\sqrt{\varepsilon_{\mathit{eff}}}},$$

where $v_0$ is the propagation velocity of electromagnetic signals along the probe in vacuum, the time-of-flight is proportional to $\sqrt{\in_{eff}}$.

Once the dielectric constant $\in_{ext}$ of the surrounding medium 8 has been determined, the effective dielectric constant $\in_{eff}$ can be determined, after which a DC-corrected (dielectric constant corrected) distance to the surface 7 of the product 6 is determined in step 105.

In order to use the method according to various embodiments of the present invention, the relationship between the propagation velocity (or time-of-flight) and the dielectric constant $\in_{eat}$ of the surrounding medium 8 should be known. This relationship can, for example, be determined by simulations based on the configuration of the transmission line probe 3 (materials, dimensions etc) and/or measurements, and may be embodied as a mathematical formula or as a lookup table, or a combination of those. Such simulations and/or measurements will be well within the reach of those skilled in the art to carry out without undue burden.

The person skilled in the art realizes that the present invention by no means is limited to the preferred embodiments described above. For example may other probe configurations than those described above with reference to FIG. 3 and FIG. 4 can be used, as long as they provide for a frequency dependent interaction with the surrounding medium. For instance, the dielectrically enclosed probe of FIG. 3 may be only partly enclosed, and the metal ribbon in FIG. 4 may be flat and/or have different hole configurations. Furthermore, similar propagation properties can be achieved with a metal ribbon that is not perforated, but has periodically varying widths along the length of the probe.

What is claimed is:

1. A guided wave radar level gauge system, for determination of a filling level of a product contained in a tank, said guided wave radar level gauge system comprising:
    a transceiver for generating, transmitting and receiving electromagnetic signals in a first frequency range and in a second frequency range different from said first frequency range;
    a single conductor transmission line probe connected to said transceiver, and arranged and configured to guide transmitted electromagnetic signals from said transceiver through a surrounding medium towards said product inside the tank, and to return reflected electromagnetic signals resulting from reflection of said transmitted electromagnetic signals by a surface of said product back towards said transceiver,
    the transmission line probe being configured to guide electromagnetic signals in said first frequency range with a first propagation velocity exhibiting a first dependence on a dielectric constant of the surrounding medium, and guide electromagnetic signals in said second frequency range with a second propagation velocity exhibiting a second dependence, different from the first dependence, on said dielectric constant of the surrounding medium; and
    processing circuitry connected to the transceiver for determining the filling level based on a first reflected electromagnetic signal in said first frequency range, a second reflected electromagnetic signal in said second frequency range, and a known relation between said first dependence and said second dependence on said dielectric constant of the surrounding medium,
    wherein the electromagnetic signals in said first frequency range and the electromagnetic signals in said second frequency range are guided by the single conductor transmission line probe in the same propagation mode.

2. The guided wave radar level gauge system according to claim 1, wherein said first frequency range has a first center frequency and said second frequency range has a second center frequency, said second center frequency being higher than one of two times, three times and five times said first center frequency.

3. The guided wave radar level gauge system according to claim 2, wherein said second center frequency is higher than one of 3 GHz, 4 GHz and 6 GHz.

4. The guided wave radar level gauge system according to claim 1, wherein said transmission line probe comprises a probe conductor and a dielectric enclosing structure at least partly enclosing said probe conductor.

5. The guided wave radar level gauge system according to claim 4, wherein said dielectric enclosing structure fully encloses substantially all of a portion of said probe conductor being arranged inside said tank.

6. The guided wave radar level gauge system according to claim 4, wherein a material thickness of said dielectric enclosing structure, in a radial direction in respect of said probe conductor, is at least 5 millimeters.

7. The guided wave radar level gauge system according to claim 1, wherein said probe conductor comprises at least two twisted conducting wires being in electrically conductive contact with each other.

8. The guided wave radar level gauge system according to claim 1, wherein said transceiver comprises:
    a first sub-transceiver for generating, transmitting and receiving electromagnetic signals in said first frequency range; and
    a second sub-transceiver for generating, transmitting and receiving electromagnetic signals in said second frequency range,
    wherein said first sub-transceiver and said second sub-transceiver are both connected to said transmission line probe.

9. The guided wave radar level gauge system according to claim 1, wherein said transmission line probe comprises a probe core formed by a stranded wire and a polymeric jacket covering said probe core.

10. The guided wave radar level gauge system according to claim 1, wherein said transmission line probe comprises a probe core formed by a metal pin and a polymeric jacket covering said probe core.

11. A method of determining a filling level of a product contained in a tank using a guided wave radar level gauge system comprising a transceiver, a single conductor transmission line probe connected to said transciever, and processing circuitry, the method comprising the steps of:
    propagating a first transmitted electromagnetic signal in a first frequency range and a second transmitted electromagnetic signal in a second frequency range different from said first frequency range along said single conductor transmission line probe towards a surface of the product in the tank in the same propagation mode;
    receiving, by said transceiver, a first reflected electromagnetic signal in said first frequency range resulting from reflection of said first transmitted electromagnetic signal at said surface and a second reflected electromagnetic signal in said second frequency range resulting from reflection of said second transmitted electromagnetic signal at said surface; and
    determining, by said processing circuitry comprised in the radar level gauge system, said filling level based on a time-of-flight of said first reflected electromagnetic signal and a difference in time-of-flight of said first reflected electromagnetic signal and said second reflected electromagnetic signal.

12. The method according to claim 11, wherein said first frequency range has a first center frequency and said second frequency range has a second center frequency, said second center frequency being higher than one of two times, three times and five times said first center frequency.

13. The method according to claim 12, wherein said second center frequency is higher than one of 3 GHz, 4 GHz and 6 GHz.

* * * * *